Oct. 11, 1955  R. J. KELLER  2,720,288
EXPANDER TUBE BRAKE WITH REMOVABLE SHOES
Filed July 19, 1950  2 Sheets-Sheet 1
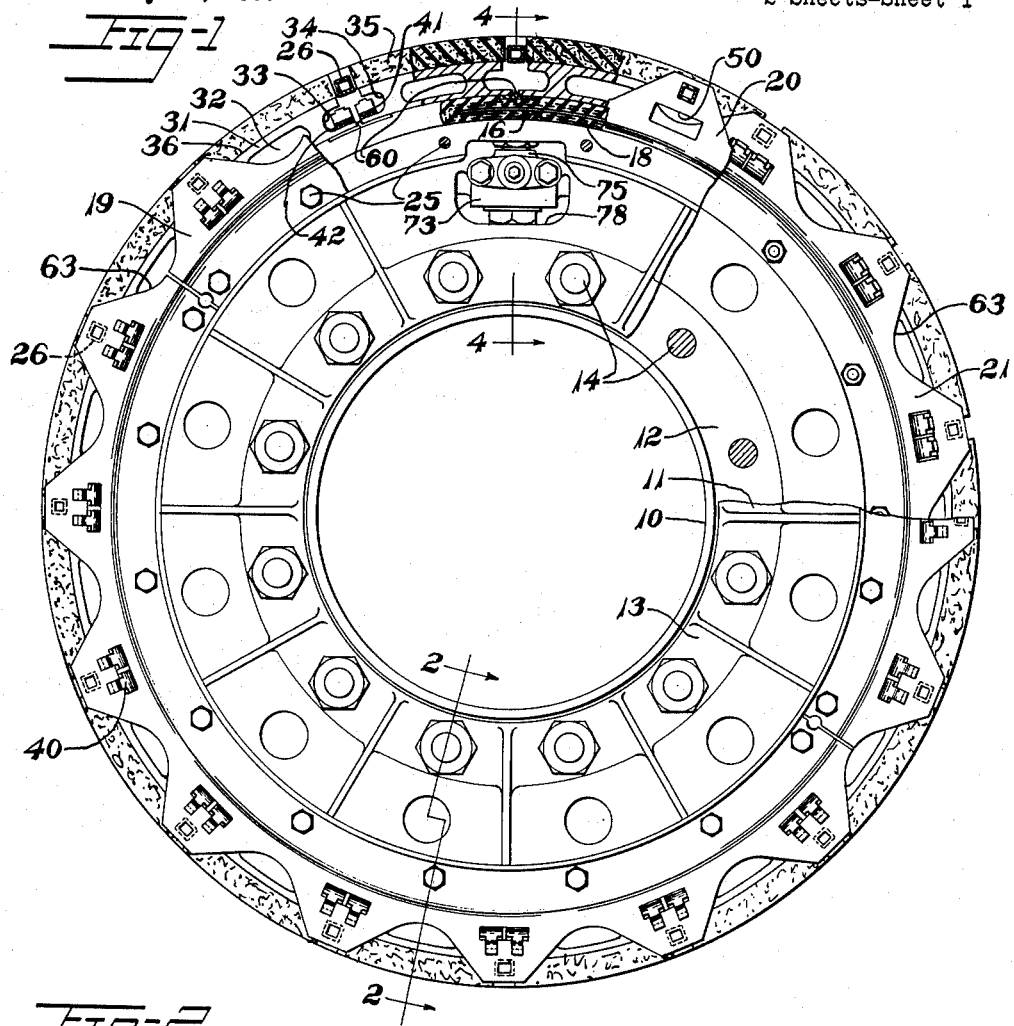
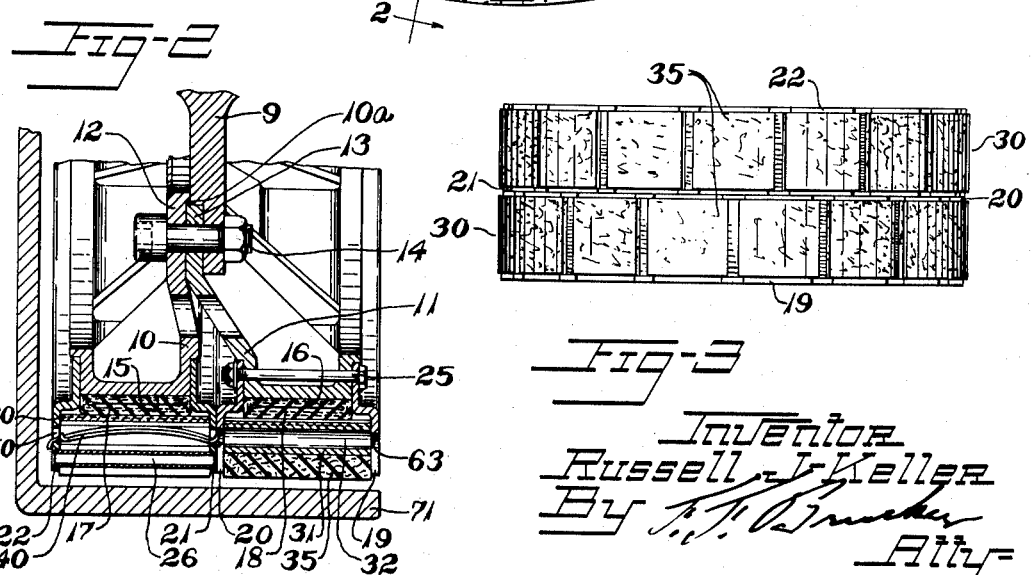
Inventor
Russell J. Keller Oct. 11, 1955  R. J. KELLER  2,720,288
EXPANDER TUBE BRAKE WITH REMOVABLE SHOES
Filed July 19, 1950  2 Sheets-Sheet 2

Inventor
Russell J. Keller
By
Att'y

United States Patent Office 2,720,288
Patented Oct. 11, 1955

2,720,288

EXPANDER TUBE BRAKE WITH REMOVABLE SHOES

Russell J. Keller, Dayton, Ohio, assignor to The B. F. Goodrich Company, New York, N. Y., a corporation of New York Application July 19, 1950, Serial No. 174,773

16 Claims. (Cl. 188—152)

This invention relates to an expander-tube operated frictional mechanism such as a brake and is especially useful as a brake for aircraft, although features of the invention are useful also in other frictional mechanism such as clutches.

With the increase in landing speeds and size of aircraft vehicles greater strength in the wheel and brake mechanism has been required and new problems of resisting forces have been presented.

Objects of the invention are to provide greater brake efficiency by a full utilization of available space for increased braking; to provide stronger and more positive retraction of the brake shoes; to provide a greater resistance to torque load; to provide improved accessibility for replacement and repair; to provide these features together with efficient cooling of the brake; and to provide economy of construction.

Figure 4:
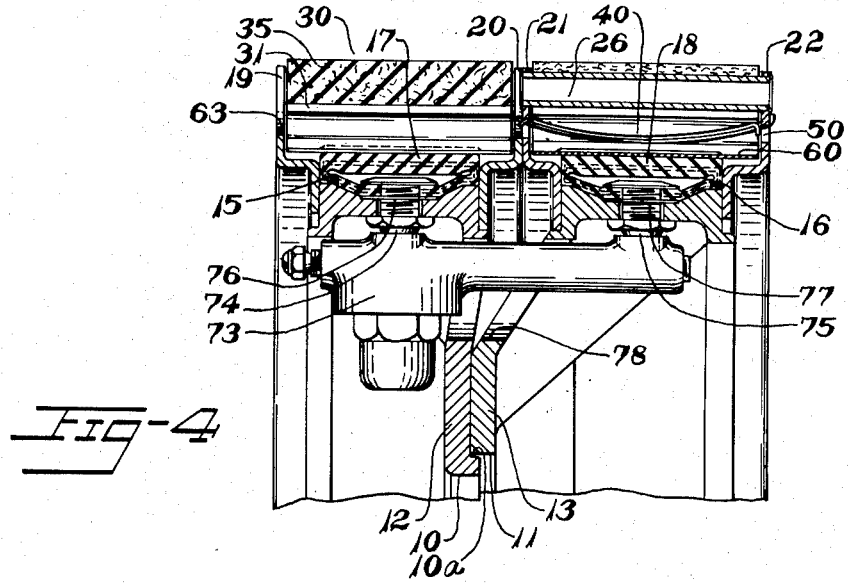
Figure 7:
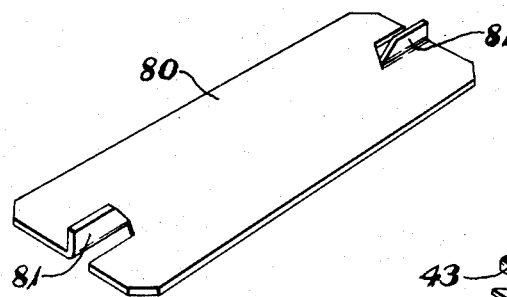
Figure 5:
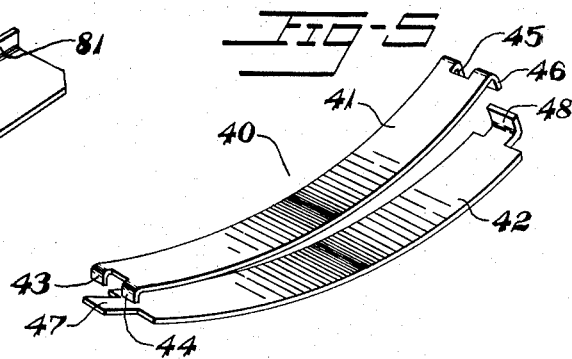
Figure 6:
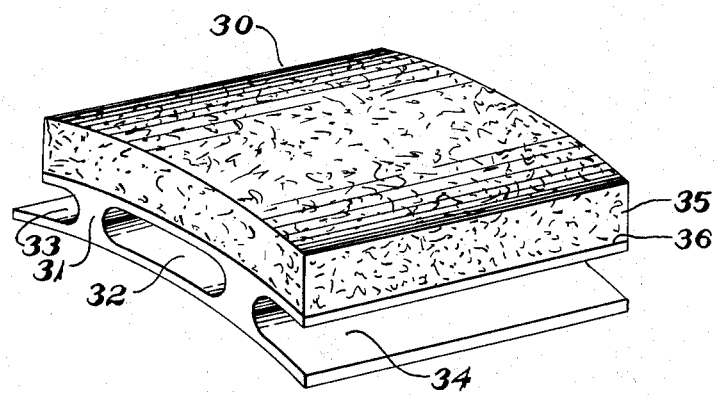
Figure 8:
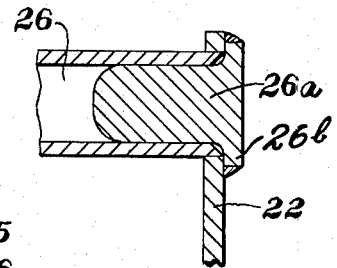

These and other objects will appear from the following description and from the accompanying drawings, Of the drawings, Fig. 1 is a side elevation, broken away in steps, and partially shown in section, of a wheel brake constructed in accordance with and embodying the invention, Fig. 2 is a cross-sectional view thereof taken on line 2—2 of Fig. 2, the supporting head and the co-operating brake drum being partly shown, Fig. 3 is a face view of the brake assembly, Fig. 4 is a cross-sectional view thereof taken on line 4—4 of Fig. 1 showing the fluid connection to the expander tubes, Fig. 5 is a perspective view of the retractor spring, and Fig. 6 is a perspective view of one of the brake shoes, Fig. 7 is a detail perspective view of a modified form of shield to protect the expander tube, Fig. 8 is a sectional view showing a modified form of a torque bar.

Referring to the drawings, the torque-resisting frame of the brake comprises a pair of rings 10, 11 having radially extending flange portions 12, 13 adapted to be secured together and to a supporting hub 9 by bolts 14 extending through the flange portions. The ring 10 has a shoulder 10a for locating the ring 11 which is seated thereon. The rings 10, 11 also have cylindrical expander tube seats 15, 16 for supporting a plurality of expander tubes in side by side relation, and these seats are of a width corresponding to the width of the expander tubes 17, 18. Rings 10, 11 are preferably made of cast metal to provide greater rigidity and strength and their cylindrical seats 15, 16 are flanked by side flanges 19, 20, 21 and 22 of metal stampings defining parallel peripheral channels which confine the expander tubes and the brake shoes laterally. These side flanges 19, 20, 21, 22 are secured to the rings 10 and 11, respectively, by bolts 25 extending therethrough, and to provide for removal of the rings, each of the rings 19, 20, 21, 22 is made of a plurality of sectors, each extending through an angle of 180°. The channels provided between pairs of side rings are wider than the expander tube seats, the rings being offset for this purpose. Side flanges 19, 20 are secured together by torque-resisting bars 26 which extend across the channels from one flange to the other. The torque bars are preferably of metal tubing to provide great strength with minimum weight, and these cross bars are secured to the side flanges, preferably by welding, as the welded bars do not project beyond the flanges and permit close positioning of the innermost flanges 20, 21. The cross bars 26 are arranged at equal intervals about the circumference of the brake but the bars connecting the side flanges 19, 20 are arranged in staggered position relative to the bars connecting the side flanges 21, 22 for purposes hereinafter described.

By constructing the flange members in 180° portions, the cross bars may be welded to the flange portions and the flange portions with the cross-bars may be removed from the rings 10, 11 by removing the bolts 25. The welding of the torque bars 26 to the side flanges permits the arrangement of side flanges 20, 21 in close relation, as shown in Fig. 4, no bolt heads being exposed laterally of the side flanges and this construction permits full use of available braking area by close axial spacing of circumferentially arranged sets of brake shoes.

The brake shoes 30, each comprises a metal block 31, preferably formed of a magnesium metal by extrusion, one of the shoes is illustrated in Fig. 6 and it will be seen that cross passages 32 extend through the metal block for ventilation purposes and that retaining flanges 33, 34 are provided at the ends of the shoe in a position to be engaged by retractor springs. A brake facing 35 of molded asbestos or other heat-resisting, friction material is provided on the braking face of the metal block and is preferably adhered thereto by a layer 36 of cement. The brake blocks are each of such arcuate extent as to permit them being entered between and removed from between successive torque bars 26 by swinging one end outwardly in advance of the opposite end of the shoe with the retractor springs removed.

For retaining the brake shoes in place over the expander tubes 17, 18 and within the channels provided by the side flanges 19, 20, 21, 22, compound retractor springs 40, illustrated in Fig. 5, are employed. These springs each comprise a plurality of leaves 41, 42 superimposed upon each other, each leaf being curved lengthwise and the ends of the leaves having interengaging portions for holding them in position with relation to each other. For this purpose the leaf 41, as shown in Fig. 5, has a bifurcated end providing a pair of spaced-apart lugs 43, 44 at one end thereof bent toward the convex face of the leaf and has a similar pair of lugs 45, 56 at its opposite end, similarly directed. The leaf 42 has a tongue 47 at one end thereof adapted to extend between the lugs 43, 44 and at its opposite end the leaf has a tongue 48 which extends between the lugs 45, 46 and is bent to extend toward the concave face of the leaf. The pair of leaves in superimposed relation may be inserted through rectangular openings 50 in the side flanges and their ends are positioned to engage the side flanges while the convex face of the leaf 42 engages a terminal flange 33 or 34 of a brake shoe 30, the arrangement is such that the end flanges of two circumferentially adjacent brake shoes extend close to each other radially inward of a torque bar 26 and a compound spring engages over the end of one brake shoe, a similar spring engages the other brake shoe, the two springs being arranged side by side across the channel. For placing the springs in position, rectangular apertures 50 are provided in the side flanges and the compound leaf spring is inserted through the outer flange 19 or 22, the outwardly turned lugs 43 and inwardly turned lugs 45, 46 straddling or engaging the outer flange 19 or 22 therebetween to hold the spring in place. This construction in combination with the staggering of the shoes in adjacent channels enables the opposite end of the spring to protrude into a space provided by the innermost side flange of the adjacent brake channel and adjacent cross passages 32 of a brake shoe. Such space is provided by the provision of ventilating notched openings 63 in the side flanges and cross passages 32 in the brake shoes, in alignment therewith, so that the two rows of brake shoes are in closely-spaced arrangement, and utilize to a high degree the available space for braking purposes. The arrangement is such that springs 40 in flanges 19, 20 and the opening 32 of a brake shoe therebetween are in alignment with springs 40 in the adjacent channel so that ends of the springs may extend into the openings 32 and 63.

To prevent the expander tubes from entering the space between the brake shoes and also to protect the expander tubes from heat radiation, a thin shield 60 of sheet metal is provided between the expander tube and the brake shoes and spanning the space between circumferentially adjacent brake shoes, the shield being formed with a rib which enters between the adjacent brake shoes and holds the shield in place.

The side flanges 19, 20, 21, 22 are formed with deep notches 63 in their outer peripheries at intervals circumferentially thereof, the notches being located between the torque bars 26, and exposing the opening 32 of the brake shoes for circulation of air to provide for cooling of the brake.

The arrangement is such that the brake shoes 30 are movably retained against the collapsed expander tube 17, 18 by the retractor springs clear of the brake drum 71. By expanding the tubes 17, 18 the shoes are forced toward the brake drum 71 against the biasing tension of the retractor springs and upon release of fluid from the expander tubes the shoes are retracted by the retractor springs.

For connecting the expander tubes to a source of fluid pressure, a manifold 73 has a pair of branch openings 74, 75 for attachment to threaded stems 76, 77 of the expander tubes. The manifold extends through a cross opening 78 of the flange rings 10, 11 and has its branch openings removably attached to the stems. The manifold is attached to a fluid pressure supply line (not shown) for supplying operating fluid pressure.

While the bolts 14 may be removed to permit removal of the brake channels separately, this is not necessary as the retractor springs are removable and replaceable through the apertures 50 of the outside ring flanges and are not locked to the innermost ring flanges. With the retractor springs removed, the brake shoes may be removed from the channels. When an expander tube is to be removed or replaced, the flange ring segments may then be removed with the torque bars by removing bolts 25.

Where additional shearing strength of the torque bars is desired without adding prohibitive weight, the ends of the torque bars 26 may be reinforced, as shown in Fig. 8, by inserting a plug 26a in each end of the torque bar. The plug is secured in the end of the torque bar and bonded thereto, as by welding or brazing. Plugs 26a are preferably formed with thin heads 26b which overlap the flanges and these heads are secured to the flanges by being bonded thereto, as by welding or brazing.

A simple modification of the shield 60 is illustrated in Fig. 7. In this form the shield 80 is a rectangular piece of thin sheet metal. A pair of lugs 81, 81 for retaining it between adjacent brake shoes is provided along a median line thereof by cutting notches in the ends of the strips and turning up the metal at the notches to provide lugs.

Variations may be made without departing from the scope of the invention as it is defined by the following claims.

I claim:

1. An expander tube brake for frictionally engaging a brake drum thereabout, said brake comprising a torque-resisting frame, channel-defining rings secured to said frame and providing therewith a plurality of axially adjacent expander tube channels, each channel being flanked by a pair of opposed said rings, said rings being of separable segments removably secured to said torque frame, torque bars extending across said channels between opposed rings and being secured to opposed ring segments for removal therewith, expander tubes in said channels, brake shoes in said channels over said expander tubes between said torque bars, each shoe having ventilating openings therethrough and ends of reduced thickness underlying said bars, retractor springs overlying a reduced end of a shoe, said rings having apertures for permitting insertion of and anchoring of said springs and ventilating notches therebetween communicating with the ventilating apertures in said shoes, and axially adjacent channel-defining ring pairs having their torque bars staggered relative to each other with said spring apertures of one ring opposite a ventilating notch of an adjacent ring to permit extension of the springs into the ventilating notches of the rings.

2. An expander tube brake for frictionally engaging a brake drum thereabout, said brake comprising a torque-resisting frame, channel-defining rings secured to said frame and providing therewith a plurality of axially adjacent expander tube channels, each channel being flanked by a pair of opposed said rings, said rings being of separable segments removably secured to said torque frame, hollow torque bars extending across said channels between opposed rings and being welded to opposed ring segments for removal therewith, expander tubes in said channels, brake shoes in said channels over said expander tubes between said torque bars, each shoe having ventilating openings therethrough and ends of reduced thickness underlying said bars, the brake shoes being removable by swinging one end radially outward of the channel in advance of the other, retractor springs individual to a brake shoe overlying a reduced end of a shoe, said channel-defining rings having apertures for permitting insertion of and anchoring of said springs and ventilating notches therebetween communicating with the ventilating apertures in said shoes, and axially adjacent channel-defining ring pairs having their torque bars staggered relative to each other with said spring apertures of one ring opposite a ventilating notch of an adjacent ring to permit extension of the springs into the ventilating notches of the rings.

3. An expander tube brake for frictionally engaging a brake drum thereabout, said brake comprising a torque-resisting frame, channel-defining rings secured to said frame and providing therewith a plurality of axially adjacent expander tube channels, each channel being flanked by a pair of opposed said rings, said rings being of separable segments removably secured to said torque frame, hollow torque bars extending across said channels between opposed rings and being welded to opposed ring segments for removal therewith, expander tubes in said channels, brake shoes in said channels over said expander tubes between said torque bars, each shoe having ventilating openings therethrough and ends of reduced thickness underlying said bars, retractor springs individual to a brake shoe and overlying a reduced end of a shoe, said channel-defining rings having apertures for permitting insertion of and anchoring of said springs and ventilating notches therebetween communicating with the ventilating apertures in said shoes, and axially adjacent channel-defining ring pairs having their torque bars staggered relative to each other with said spring apertures of one ring opposite a ventilating notch of an adjacent ring to permit extension of the springs into the ventilating notches of the rings.

4. An expander tube brake for frictionally engaging a brake drum thereabout, said brake comprising a torque-resisting frame, channel-defining rings secured to said frame and providing therewith a plurality of axially adjacent expander tube channels, each channel being flanked by a pair of opposed said rings, said rings being of separable segments removably secured to said torque frame, hollow torque bars extending across said channels between opposed rings and being welded to opposed ring segments for removal therewith, expander tubes in said channels, brake shoes in said channels over said expander tubes between said torque bars, each shoe having ventilating openings therethrough and ends of reduced thickness underlying said bars, retractor springs individual to a brake shoe and overlying a reduced end of a shoe, each retractor spring comprising a plurality of leaves having interengaging ends for retaining them in place, said channel-defining rings having apertures for permitting insertion of and anchoring of said springs and ventilating notches therebetween communicating with the ventilating apertures in said shoes, and axially adjacent channel-defining ring pairs having their torque bars staggered relative to each other with said spring apertures of one ring opposite a ventilating notch of an adjacent ring to permit extension of the springs into the ventilating notches of the rings.

5. An expander tube brake for frictionally engaging a brake drum thereabout, said brakes comprising a torque-resisting frame providing a plurality of axially spaced-apart circumferential expander tube seats, channel-defining rings secured to said frame at sides of said seats and providing therewith a plurality of axially adjacent expander tube channels, each channel being flanked by a pair of opposed said rings and said rings being laterally offset at said seats providing channels of greater width than said seats, said rings being of separable segments removably secured to said torque frame, hollow torque bars extending across said channels between opposed rings and being welded to opposed ring segments for removal therewith, expander tubes in said channels, brake shoes in the wide portions of said channels over said expander tubes between said torque bars, each shoe having ventilating openings therethrough and ends of reduced thickness underlying said bars, the brake shoes being removable by swinging one end radially outward of the channel in advance of the other, retractor springs individual to a brake shoe and overlying a reduced end of a shoe, each retractor spring comprising a plurality of leaves having interengaging ends for retaining them in place, said channel-defining rings having apertures for permitting insertion of and anchoring of said springs and ventilating notches therebetween communicating with the ventilating apertures in said shoes, and axially adjacent channel-defining ring pairs having their torque bars staggered relative to each other with said spring apertures of one ring opposite a ventilating notch of an adjacent ring to permit extension of the springs into the ventilating notches of the rings.

6. An expander tube brake for frictionally engaging a brake drum thereabout, said brake comprising a plurality of brake units mounted on a common support in laterally adjacent relation for simultaneous operation, each brake unit comprising an angular expander tube seat, side rings flanking said seat and defining therewith a channel, an expander tube in said channel, torque bars extending across said channel from side ring to side ring, brake shoes mounted over said expander tube within said channel, said shoes having ventilating cross openings therethrough and having ends of reduced thickness underlying said torque bars, and retractor springs mounted between said torque bars and the reduced ends of said shoes, said side rings having ventilating openings therein aligned with the openings of said shoes and having apertures therethrough at said torque bars for permitting placement and removal of said springs, and said brake units being mounted on their support with the ventilating openings of the side rings of one unit aligned with the retractor springs of an adjacent unit and providing clearance for the ends of the springs.

7. An expander tube brake for frictionally engaging a brake drum thereabout, said brake comprising a plurality of brake units mounted on a common support in laterally adjacent relation for simultaneous operation, each brake unit comprising an annular expander tube seat, side rings flanking said seat and defining therewith a channel, an expander tube in said channel, tubular torque bars extending across said channel from side ring to side ring and welded to said side rings, said side rings being made in segments for removal, brake shoes mounted over said expander tube within said channel, said shoes having ventilating cross openings therethrough and having ends of reduced thickness underlying said torque bars, and retractor springs mounted between said torque bars and the reduced ends of said shoes, said side rings having ventilating openings therein aligned with the openings of said shoes and having apertures therethrough at said torque bars for permitting placement and removal of said springs, and said brake units being mounted on their support with the ventilating openings of the side rings of one unit aligned with the retractor springs of an adjacent unit and providing clearance for the ends of the springs.

8. Frictional mechanism comprising inner and outer concentric relatively rotatable members, said inner member having a pair of axially adjacent outwardly facing channels defined by axially extending side rings and a supporting ring providing an expander tube seat therebetween, an expander tube seated in each channel, torque bars extending across a channel from side ring to side ring, friction shoes retained in said channels over the expander tubes, said shoes having laterally extending ventilating openings and ends of reduced thickness underlying said torque bars, said side rings having ventilating openings therethrough in alignment with the openings of the shoes therebetween, leaf retractor springs between the reduced ends of said shoes and said torque bars, said side rings having openings through which the ends of said springs extend, and the torque bars and spring openings of one channel being in alignment with the ventilating openings of an adjacent channel so that the ends of said springs project into said ventilating openings.

9. Frictional mechanism comprising a pair of channels side-by-side, each channel having an outside portion away from the other channel and an inside portion close to the other channel, a row of friction elements in each channel, each element being movable outwardly of its respective channel and being located in staggered relation to the elements in the other channel, an opening into each element into the side thereof facing the other channel, and retractor springs for opposing said outward movement of the friction elements, each spring being engaged with a friction element and having one end fixed to said outside portion of the channel of the friction element and having the opposite end of the spring aligned with said opening of another friction element in the other channel, said opposite end of the spring being movable into and out of said opening as the element with which the spring is engaged is moved in its respective channel.

10. Frictional mechanism comprising a first channel with a first friction element disposed therein, a second channel beside the first channel with a second friction element disposed therein, the first element being located in staggered relation to the second element so that one end of the first element is offset laterally from a portion of the second element intermediate the ends of the second element, an opening into the second element in the side thereof facing said end of the first element, a pair of flanges on the first channel flanking said end of the first element, an aperture in the flange close to the second element which aperture substantially registers with the side opening of the second element, a spring disposed transversely across the first channel in engagement with the first element, one end of the spring being fastened to the flange away from the second channel and the other end of the spring projecting through said aperature in the opposite flange and being directed toward the side opening of the second element, and means for moving said elements outwardly from their respective channels against the resistance of the spring whereby the unfastened end of the spring is movable through the aperture into the side opening of the second element.

11. Frictional mechanism comprising a channel having side flanges, apertures located opposite each other in the side flanges, a friction element in said channel, means for moving said friction element outwardly of the channel, and retractor means engaged with the friction element to oppose said outward movement of the friction element, the retractor means comprising a first leaf spring having a tongue projecting away from one end thereof, and a second leaf spring superimposed on the first leaf spring, the second leaf spring having gripping lugs to engage each end of the first leaf spring to prevent relative longitudinal movement between the two leaf springs, said assembly of the first and second springs being disposed transversely across the channel between said apertures with said tongue of the first spring and the lugs of the second spring cooperating to removably engage between them one of the flanges at the aperture therein to anchor one end of the spring assembly thereto, and the opposite end of the spring extending into the aperture of the other flange and being movable back and forth through said aperture as the spring is flexed.

12. Frictional mechanism comprising an annular support member, friction elements disposed circumferentially around the support member, flanges at the sides of the support member to contain the friction elements between the flanges, the flanges being formed with a plurality of arcuate segments removably fastened to the sides of the support member, and a plurality of spaced-apart torque bars extending crosswise between a pair of opposed arcuate flange segments to space the friction elements circumferentially from each other, the ends of each torque bar terminating at and being secured to each of said segments and said pair of segments and the torque bars fastened thereto being removable from the support member as a unit.

13. Friction mechanism comprising an annular support member, friction elements disposed circumferentially around the support member, flanges at the margins of the support member defining a channel to contain the friction elements, the flanges being formed of a plurality of pairs of opposed arcuate segments removably fastened to the support member, a plurality of torque bars extending between each pair of opposed segments and secured to said segments to space the friction elements circumferentially from each other, and retractor springs each engaged with a friction element and said flanges, each pair of opposed segments and their connecting torque bars together with the friction elements and retractor springs being individually removable from the support member as a unit.

14. Frictional mechanism comprising an annular support member, friction elements disposed circumferentially around the support member, means interposed between said elements and the support member for moving said friction elements radially outward from the support member, flanges directed radially outward from the margins of the support member defining a channel to contain the friction elements, the flanges being formed of a plurality of pairs of opposed arcuate segments removably fastened to the support member, a plurality of torque bars extending between each pair of opposed segments and the ends of each bar being welded to its respective segments to space the friction elements circumferentially from each other, retractor springs each engaged with a friction element and said flanges to resist said radial movement of the friction elements, and apertures in said segments through which the retractor springs are insertable to assemble the springs with the friction elements and said segments, each pair of opposed segments and the connecting torque bars together with the friction elements and retractor springs being individually removable as a unit from the support member and said means.

15. Frictional mechanism comprising a pair of annular channels disposed side-by-side, each of the channels being defined by a pair of radially-directed side flanges, the flanges adjacent each other of the channels having registering apertures to provide communication from one channel to the other channel, a friction element in one of said channels, means for moving said element outwardly of the channel, and retractor means to oppose said outward movement of the friction element, the retractor means comprising a leaf spring extending transversely across the channel and engaged with the friction element, one end of the spring being connected to the flange of said channel opposite said apertures and the other end of the leaf spring projecting into said apertures and being movable through said apertures into the other channel when the friction element is urged outwardly.

16. A retractor spring for a frictional mechanism such as a brake having a pair of spaced apertured radial flanges defining a channel to contain a friction element movable radially between the flanges, the retractor spring comprising a first narrow thin flexible metal leaf having a tongue projecting from one end thereof with a portion of the tongue bent upwardly from the leaf and having another tongue projecting from the opposite end of said leaf, and a second narrow thin flexible metal leaf superimposed on the first said leaf, the second leaf having gripping lugs to engage each end of the first leaf to prevent relative longitudinal movement between the leaves and the gripping lugs embracing said tongues of the first leaf to prevent lateral movement between the leaves, said assembly of said first and second leaves being adapted to be disposed transversely between a pair of opposed apertures of the flanges with said upwardly-bent tongue of the first leaf projecting through one of said apertures and embracing the exterior of the flange whereby the tongue and the lugs of the second leaf cooperate to engage the flange between them to anchor the spring assembly thereto, and the opposite end of the assembly of said first and second leaves extending into the opposing aperture and being adapted for slidable movement through said aperture when the brake shoe is radially moved between the flanges.

References Cited in the file of this patent

UNITED STATES PATENTS

| | | |
|---|---|---|
| 1,780,200 | Linderman | Nov. 4, 1930 |
| 1,782,566 | Down | Nov. 25, 1930 |
| 2,202,301 | Probst | May 28, 1940 |
| 2,289,549 | Norstrom | July 14, 1942 |
| 2,349,494 | Fawick | May 23, 1944 |
| 2,386,116 | Hunter | Oct. 2, 1945 |
| 2,386,313 | Hollerith | Oct. 9, 1945 |
| 2,389,977 | Hollerith | Nov. 27, 1945 |
| 2,434,762 | Fawick | Jan. 20, 1948 |